United States Patent
Shanahan

(10) Patent No.: US 6,424,255 B1
(45) Date of Patent: Jul. 23, 2002

(54) ADJUSTABLE DELAY TURN SIGNAL REMINDER DEVICE FOR MOUNTING ON A MOTORCYCLE AND THE LIKE

(75) Inventor: Sean Shanahan, 10755 W. 7th Pl. #3, Lakewood, CO (US) 80215

(73) Assignees: Charles Drake, Littleton; Sean Shanahan, Lakewood, both of CO (US)

(*) Notice: Subject to any disclaimer, the term of this patent is extended or adjusted under 35 U.S.C. 154(b) by 0 days.

(21) Appl. No.: 09/777,772

(22) Filed: Feb. 7, 2001

(51) Int. Cl.[7] .................................................. B60Q 1/26
(52) U.S. Cl. ........................ 340/457; 340/475; 340/477; 180/315; 362/473
(58) Field of Search .............................. 340/457, 475, 340/476, 477, 472, 449, 474; 180/315; 200/61.27; 280/263; 362/473

(56) References Cited

U.S. PATENT DOCUMENTS

| | | | | |
|---|---|---|---|---|
| 4,204,191 A | * | 5/1980 | Daniels | 340/475 |
| 5,519,378 A | * | 5/1996 | Queensbury | 340/475 |
| 5,523,738 A | * | 6/1996 | Fuller | 340/475 |
| 5,617,303 A | * | 4/1997 | Izzo, Sr. | 362/72 |
| 5,801,622 A | * | 9/1998 | Chunick | 340/457 |
| 5,933,076 A | * | 8/1999 | Babb | 340/475 |
| 5,955,943 A | * | 9/1999 | Trbovich | 340/475 |
| 6,236,306 B1 | * | 5/2001 | Liebelt | 340/407.1 |

* cited by examiner

Primary Examiner—Daniel J. Wu
Assistant Examiner—Davetta W. Goins
(74) Attorney, Agent, or Firm—Edwin H. Crabtree; Ramon L. Pizarro; Donald W. Margolis

(57) ABSTRACT

An adjustable delay turn signal reminder device adapted for mounting on a motorcycle and other vehicles. The reminder device is designed with safety in mind and give a vehicle operator a visual and/or audio signal, after a predetermined time, that a left turn signal or right turn signal on the vehicle needs to be turned "off". The reminder device includes an electrical circuit housing with housing carrier and straps for securing the housing on the instrument panel of the motorcycle. The electrical circuit housing includes electrical leads for connecting the housing to the vehicle's left and right turn signals, a lead for connecting to the vehicle's battery for providing a power source to the housing, leads connected to an audio/visual unit mounted on the instrument panel and a lead connected to the motorcycle's brake signal light. Also, the circuit housing includes an audio/visual control knob and a time delay control knob. The audio/visual control knob is connected to the audio/visual unit for controlling the volume of sound from the unit and controlling the intensity of light from the unit. The time delay control knob is connected to a timing circuit in the housing for adjusting a time delay before the power to the audio/visual unit is actuated.

13 Claims, 1 Drawing Sheet

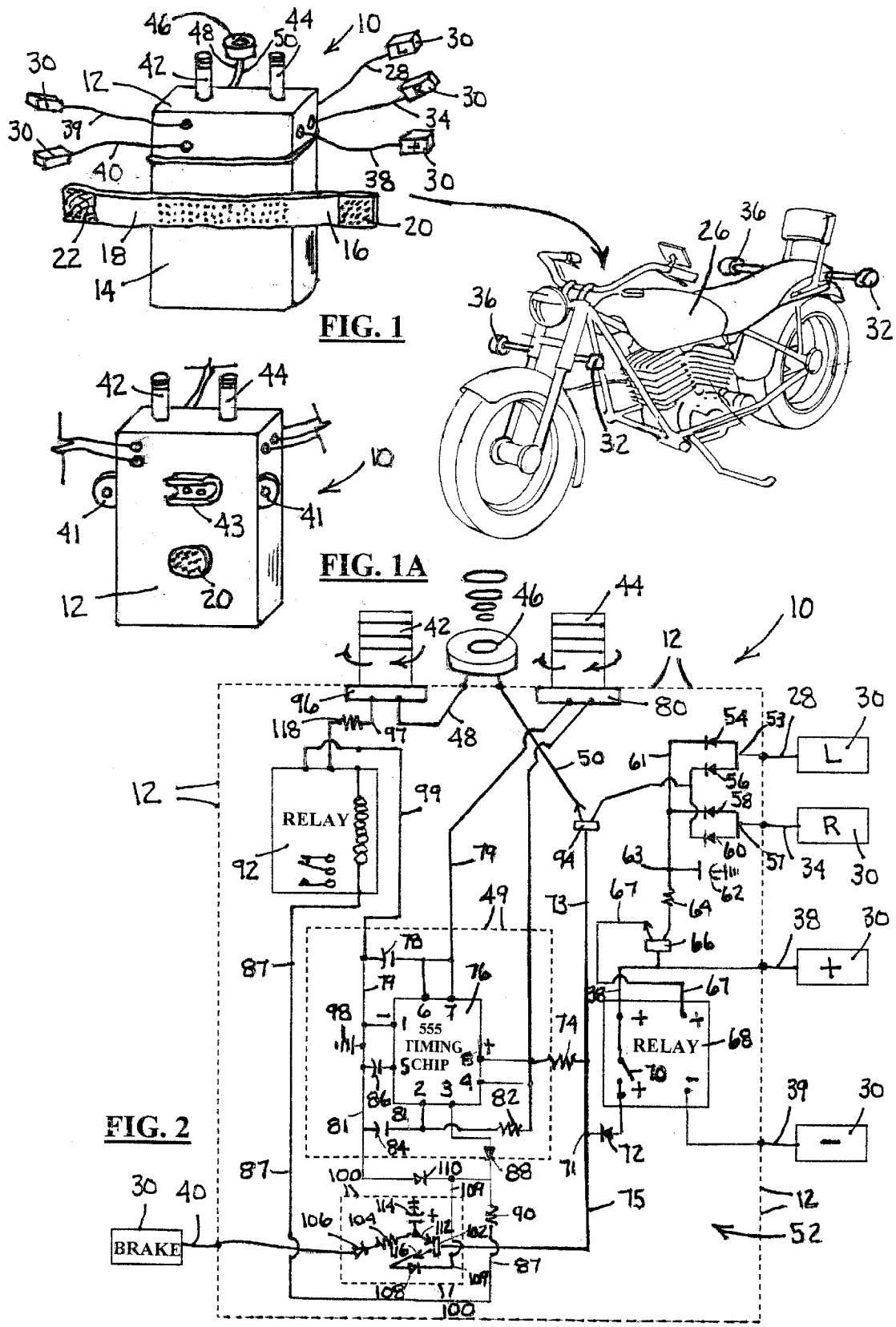

ADJUSTABLE DELAY TURN SIGNAL REMINDER DEVICE FOR MOUNTING ON A MOTORCYCLE AND THE LIKE

BACKGROUND OF THE INVENTION (a) Field of the Invention

This invention relates to accessories attached to vehicle turn signals and more particularly, but not by way of limitation, to a turn signal device for reminding a vehicle driver that a left or a right turn signal has not been turn "off" after a predetermined time period.

(b) Discussion of Prior Art

Heretofore, there have been various types of vehicle turn signal devices for indicating a left or a right turn of a vehicle. For example, U.S. Pat. No. 5,523,738 to Fuller discloses a turn indicator safety augmenter for a road vehicle. The safety augmenter includes an electronic interface with flasher and tone generator. In U.S. Pat. 4,361,829 to Kramholler et al. and U.S. Pat. No. 5,519,378 to Queensbury, two different types of turn signal systems are described for use with a motorcycle. Also, in U.S. Pat. No. 4,924,208 to Coughlin, U.S. Pat. No. 4,241,328 to Lobe et al., U.S. Pat. No. 5,414,407 to Gerrans et al. and U.S. Pat. No. 5,309,143 to Brown et al. different types of electronic circuits are disclosed and used with vehicle turn signals and blinker lights.

None of the above mentioned patents describe or teach individually or in combination the unique safety features, advantages, structure and function of the subject adjustable delay turn signal reminder device as described herein.

SUMMARY OF THE INVENTION

In view of the foregoing, it is a primary object of the subject invention to provide an adjustable delay turn signal reminder device adapted for mounting on a motorcycle and other vehicles.

Another object of the turn signal reminder device is it is designed with safety in mind. The device gives a vehicle operator a visual and/or audio signal after a predetermined time which is set by the vehicle operator based on his or her personal driving habits or personal preference. The signal indicates that a left turn signal or a right turn signal on the vehicle needs to be turned "off" to the benefit of the vehicle operator and to the benefit of operators of vehicles approaching or trailing the vehicle. Also, the signal device will sound a "chirp" if the power to the device is for some reason cut off.

Still another object of the invention is the device is inexpensive and easy to install on a motorcycle and other vehicles. The reminder device can be part of the original equipment when a vehicle is purchased or can be installed as an accessory after the vehicle is purchased.

Yet another object of the reminder device is the volume of the audio signal can be controlled and the light intensity of the visual signal can be controlled by merely turning "up" or "down" an audio/visual control knob to help the operator of the vehicle hear and/or see the alert warning from the reminder device. This feature is important depending on various weather conditions, street noise, travel during the night or day, an operator with a hearing disability and other driving factors and conditions.

A further object of the reminder device is the amount of time delay before the audio/video signal is turned "on" can be easily controlled by merely adjusting a time delay control knob.

The reminder device includes an electrical circuit housing with housing carrier and straps for securing the housing on the instrument panel of the motorcycle. The electrical circuit housing includes electrical leads for connecting the housing to the vehicle's left and right turn signals, a lead for connecting to the vehicle's battery and providing a power source to the housing, leads connected to an audio/visual unit attached to the instrument panel and a lead connected to the motorcycle's brake signal light. Also, the circuit housing includes an audio/visual control knob and a time delay control knob. The audio/visual control knob is connected to the audio/visual unit for controlling the volume of sound from the unit and controlling the intensity of light from the unit. The time delay control knob is connected to a timing circuit in the housing for adjusting a time delay before the power to the audio/visual unit is actuated.

These and other objects of the present invention will become apparent to those familiar with electrical and mechanical vehicle turn signals when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a perspective view of the adjustable delay turn signal reminder device positioned for mounting next to an instrument panel of a motorcycle. The reminder device is shown with an electrical circuit housing received in a housing carrier with mounting straps.

FIG. 1A is another perspective view of the adjustable delay turn signal reminder device illustrating a circuit housing having various fasteners for mounting the reminder device on the motorcycle, a dash of a vehicle and other locations for operation and viewing by a vehicle operator.

FIG. 2 is a circuit diagram of an electric circuit inside the circuit housing. The housing includes electrical leads, a audio/visual unit, an audio/visual control knob and a time delay control knob.

DESCRIPTION OF THE PREFERRED EMBODIMENTS

In FIG. 1, a perspective view of the adjustable turn signal reminder device is shown and having general reference numeral 10. The reminder device 10 is shown with an electrical circuit housing 12 slidably stored inside a housing carrier 14. The carrier 14 includes mounting straps 16 and 18 with hook fasteners 20 and loop fasteners 22 for securing the reminder device 10 next to an instrument panel, as indicated by arrow 24, of a motorcycle 26.

The reminder device 10, while discussed in detail and associated with the motorcycle 26, it should be kept in mind the device is readily adapted for use with various types of vehicles having turn signals thereon. Also, while the housing carrier 14 is shown, obviously the reminder device 10 may be attached to a vehicle in a variety of ways without departing from the spirit and scope of the invention.

The reminder device 10 includes the electrical circuit housing 12 with circuitry therein. The housing 12 is shown with an electrical lead 28 and an electrical connector 30 for connecting to the vehicle's left turn signals 32 and an electrical lead 34 with connector 30 for connecting to the vehicle's right turn signals 36. Obviously, the electrical leads 28 and 34 can be connected only to the rear turn signals or to the front turn signals or both front and rear turn signals. Also, the housing 12 is shown with an electrical lead 38 with an electrical connector 30 for connecting to the vehicle's battery for providing a power source to the circuitry and an electrical lead 39 with connector 30 for attaching to a ground on the vehicle. Further, the housing 12 includes an electrical lead 40 with an electrical connector 30 for connecting the circuitry to the vehicle's brake light system if desired. The vehicle's battery and brake light system are not shown in the drawings.

Extending upward from the top of the circuit housing 12 is an audio/visual control knob 42 and a time delay control knob 44. The audio/visual control knob 42 is connected to an audio/visual unit 46 via electrical leads 48 and 50 for controlling the volume of sound and the intensity of light from the unit 46 and alerting the operator of the motorcycle 26. The time delay control knob 44 is connected to a timing circuit 49 in the housing 12 for adjusting a time delay before power is actuated to the audio/visual unit 46. The timing circuit 49 is shown in dashed line in FIG. 2. The control knobs 42 and 44 are elongated and extend upwardly from the housing 12 for ease in gripping by the operator of the vehicle and making necessary adjustments at any time to the time delay and the volume and light intensity of the audio/visual unit 46.

In FIG. 1A, another perspective view of the adjustable delay turn signal reminder device 10 is illustrated. In this drawing, the circuit housing 12 is shown having various types of fasteners for mounting the reminder device 10 on the motorcycle 26, on a dash of a vehicle and other locations for operation and viewing by a vehicle operator. The housing 12 is shown having a pair of outwardly extending ears 41 with holes therein for receiving screws when securing the device 10 to the front of a vehicle dash. Also, the housing 12 can include a hook fastener 20 for engaging loop fasteners on the dash of the vehicle. Further, the housing 12 can include a clip 43 for mounting the housing 12 on the handle bars of the motorcycle 26. Obviously, there are any number of different types of fasteners that will work equally well in securing the reminder device 10 on different types of vehicles.

In FIG. 2, a circuit diagram is illustrated of an electrical circuit, having general reference numeral 52, inside the circuit housing 12. The circuit housing 12 is shown in dashed lines in the drawing.

In operation, the circuit 52 is activated by the operator of the vehicle turning on the left turn signal 32 or right turn signal 36. The signal potential from the left turn signal 32 travels via lead 28 to an input junction 53 where the signal is split prior to traveling to a first input diode 54 and a second input diode 56. Likewise, the signal potential from the right turn signal 36 travels via lead 34 to an input junction 57 where the signal is split prior to traveling to a third input diode 58 and a fourth input diode 60. The diodes 58 and 60 and diodes 54 and 56 prevent operation of the left and right turn signals 32 and 36 from interfering with each other.

The first input diode 54 and second input diode 58 are connected by the lead 61. The signal potential, which passes through the diode 54 or the diode 58, is split at a junction 63. At the junction 63, the signal voltage is used to charge an input capacitor 62. The input capacitor 62 is polarized and helps maintain a steady signal potential to the electrical circuit 52.

The signal potential through lead 61 also passes through a resister 64 to the collector of a transistor 66. The base of the transistor 66 is coupled to the battery power source via the electrical lead 38. The emitter of the transistor 66 is connected via lead 67 to a main relay chip 68. When the signal potential from the actuation of either the left turn signals 32 or the right turn signals 36 arrives at the transistor 66, a voltage is applied to the main relay chip 68. The electrical connection to the relay chip 68 also connects the power source from the electrical lead 38 to the rest of the circuit 52 by closing a switch 70 in the relay chip 68. This electrical feature helps provide more accurate timing by a stable voltage to the circuit's timing chip.

When the switch 70 is closed, the electrical power is split at a junction 71 to a lead 73 and a lead 75. The lead 73 includes a main power junction 77 and a diode 72 connected at junction 71. A regulating resister 74 is connected to the junction 77 for regulating the potential and current to the timing circuit 49. The timing circuit 49 includes a 555 timing chip 76. The 555 timing chip 76 is connected via a lead 79 to a timing capacitor 78 and a charging potentiometer 80. The resistance of the charging potentiometer 80 is controlled by the time delay control knob 44. The timing capacitor 78 acts as the time keeper for the timing chip 76. When the timing capacitor 78 is charged to a critical switching voltage in the timing chip 76, then the timing cycle is complete. The charging potentiometer 80 allows an adjustable time constant when charging the timing capacitor 78. This adjustable time constant allows the timing cycle of the 555 timing chip 76 to be adjusted as well. The adjustable timing cycle, for example, may be from 1 second to 60 seconds and greater.

Also connected to the 555 timing chip 76 is a time delay RC circuit including a charging resistor 82 and a capacitor 84 connected via lead 81. The charging resistor 82 allows the capacitor 84 to charge so that it may provide power to the 555 timing chip 76 or activate the time delay cycle until power is removed. Also, the capacitor 84 helps prevent false triggering of the circuit.

The timing circuit 49 connected to the 555 timing chip 76 further includes a regulating capacitor 86 which helps to protect the 555 timing chip 76 in case of any discontinuities in power. The main purpose of the 555 timing chip 76 is to send power via a lead 87 through a diode 88 and across a resistor 90 to a final relay chip 92 until the timing cycle is complete. A diode 110 is used to absorb voltage from the relay chip 92 through the resister 90 via lead 87.

The audio/visual unit 46 is connected to the output of a power transistor 94 via lead 50. The collector of the power transistor 94 is connected to the second and fourth diodes 56 and 60 and switches power on and off to the left and right signals 32 and 36 via lead 95. The base of the transistor 94 is connected via lead 73 to the power junction 77. When the power arrives at the power transistor 94, the electrical power is then transmitted to the audio/visual unit 46. The audio/visual unit 46 may be a sound speaker with an audio alarm or a flashing light or a combination of both. The audio/visual unit 46 is connected to an adjustable potentiometer 96 via lead 48. The resistance of the potentiometer 96 is adjusted by manipulation of the audio/visual control knob 42. The adjustable potentiometer 96 allows the user of the device 10 to control the amount of power used by the potentiometer 96 to the control knob 42 and thus control the amount of sound and light intensity from the audio/visual unit 46. While the audio/visual unit 46 is shown in the drawings, it should be kept in mind a visual unit could be used alone with the device 10 or an audio unit could be used alone with the device 10.

The potentiometer 96 is also connected to the final relay chip 92 via lead 97. The power transistor 94 is prevented from transmitting power to the audio/visual unit 46 and the potentiometer 96 by the final relay chip 92 is held open until the timing cycle of the timing circuit is complete. The final relay chip 92 matches the potential from the power transistor 94 until the timing circuit no longer sends current through the resistor 90 and into the final relay chip 92.

When the timing cycle is complete and the current through the diode 88 and resistor 90 stops via lead 87 stops. At this time, the final relay chip 92 closes to ground 98 via leads 99 and 79 and the audio/visual unit 46 is activated via lead 97 through resister 118 connected to potentiometer 96.

The turn signal reminder device 10 further includes an optional pausing circuit, shown in dashed lines 100. The pausing circuit 100 includes a pausing transistor 102. The base of the pausing transistor 102 is connected via lead 75 to diode 72 connected to the output of the relay chip 68. A collector 112 of the transistor 102 is connected to a polarized capacitor 114, a resistor 104, a diode 106 and then to a brake signal via electrical lead 40. When activated by engaging the brake of the motorcycle 26, current is sent through the diode 106 and resistor 104.

The resistor 104 serves two purposes. The first purpose is the resistor 104 helps determine the time of charge of the polarized capacitor 114, which has to reach a triggering voltage of the pausing transistor 102. This feature prevents the pausing circuit 100 from adding a pause to the audio/visual unit 46 when current is applied via the brake electrical lead 40, for example, if the time period is less than 6 seconds. The second purpose is to slowly put greater or less charge to the polarized capacitor 114, which would add a pause to the audio/visual unit 46. The pause, for example, being greater than 8 seconds.

The emitter 116 of the pausing transistor 102 sends current through the resistor 90 via lead 109 and to the final relay chip 92. This connection provides the necessary current to the chip 92 to hold the switch in the relay chip 92 open, thus stopping the connection to ground 98 and deactivating the connection to the audio/visual unit 46 until the brake of the vehicle is disengaged.

When the brake of the vehicle is disengaged, the current to the polarized capacitor 114 begins to discharge until the voltage in the capacitor 114 drops below a switching voltage of the pausing transistor 102. At this time, the transistor 102 no longer provides the final relay chip 92 with current. The final relay chip 92 can now dump power via the capacitor 114 to the ground 98 and current to the resistor 118, potentiometer 96 and the audio/visual unit 46 via leads 97 and 48. The audio/visual unit 46 is then activated and the timing circuit 49 is completed.

It should be mentioned that if power is cut off to the power transistor 94 via lead 95 or 50, the device 10 will give a "chirp" indicating low power or no power and in sink with input diodes 54, 56, 58 and 60.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. An adjustable delay turn signal reminder device adapted for mounting on an instrument panel of a motorcycle and other vehicles, the device gives a vehicle operator an operator signal, after a predetermined time, that a left turn signal or a right turn signal on the vehicle needs to be turned "off", the reminder device comprising:
    an electrical circuit disposed inside a circuit housing, said circuit housing adapted for receipt on the instrument panel;
    left and right turn signal electrical leads connected to said electrical circuit, said left and right turn signal electrical leads adapted for connecting the motorcycle's left and right turn signals to said electrical circuit;
    power electrical lead connected to said electrical circuit, said power electrical lead adapted for connecting a power source to said electrical circuit and providing electrical power thereto;
    an operator signal unit electrically connected to said electrical circuit;
    a signal unit control means electrically connected to said electrical circuit, said signal unit control means for controlling the amount of power to said operator signal unit;
    a time delay control means electrically connected to said electrical circuit, said time delay control means for adjusting a time delay before the power to said operator signal unit is actuated; and
    brake electrical lead connected to said electrical circuit, said brake electrical lead adapted for connecting to the motorcycle's brake system and causing a pause to said electrical circuit when the brake system is activated.

2. The reminder device as described in claim 1 wherein said operator signal unit is an audio/visual alert unit.

3. The reminder device as described in claim 2 wherein said signal unit control means is an audio/visual control knob mounted on said circuit housing.

4. The reminder device as described in claim 1 wherein said time delay control means is a time delay control knob mounted on said circuit housing.

5. The reminder device as described in claim 1 wherein said operator signal unit is a visual alert unit.

6. The reminder device as described in claim 1 wherein said operator signal unit is a visual alert unit.

7. An adjustable delay turn signal reminder device adapted for mounting on an instrument panel of a motorcycle and other vehicles, the device gives a vehicle operator an operator signal, after a predetermined time, that a left turn signal or a right turn signal on the vehicle needs to be turned "off", the reminder device comprising:
    an electrical circuit disposed inside a circuit housing, said circuit housing adapted for receipt on the instrument panel;
    left and right turn signal electrical leads connected to said electrical circuit, said left and right turn signal electrical leads adapted for connecting the motorcycle's left and right turn signals to said electrical circuit;
    power electrical lead connected to said electrical circuit, said power electrical lead adapted for connecting the motorcycle's battery to said electrical circuit and providing a power source thereto;
    an operator signal unit electrically connected to said electrical circuit;
    a signal unit control knob mounted on said housing and electrically connected to said electrical circuit for controlling the amount of power to said operator signal unit;
    a time delay control knob mounted on said housing and electrically connected to said electrical circuit for adjusting a time delay before the power to said operator signal unit is actuated; and brake electrical lead connected to said electrical circuit, said brake electrical lead adapted for connecting to the motorcycle's brake system and causing a pause to said electrical circuit when the brake system is activated and after the brake system is released.

8. The reminder device as described in claim 7 wherein said operator signal unit is an audio/visual alert unit.

9. The reminder device as described in claim 8 wherein said signal unit control knob is an audio/visual control knob.

10. The reminder device as described in claim 7 wherein said operator signal unit is an audio alert unit.

11. The reminder device as described in claim 7 wherein said operator signal unit is a visual alert unit.

12. An adjustable delay turn signal reminder device adapted for mounting on an instrument panel of a motorcycle and other vehicles, the device gives a vehicle operator an operator signal, after a predetermined time, that a left turn signal or a right turn signal on the vehicle needs to be turned "off", the reminder device comprising:

an electrical circuit disposed inside a circuit housing, said circuit housing adapted for receipt on the instrument panel of a motorcycle;

left and right turn signal electrical leads connected to said electrical circuit, said left and right turn signal electrical leads adapted for connecting the motorcycle's left and right turn signals to said electrical circuit;

power electrical lead connected to said electrical circuit, said power electrical lead adapted for connecting the motorcycle's battery to said electrical circuit and providing a power source thereto;

an audio/visual alert unit electrically connected to said electrical circuit;

an audio/visual control knob mounted on said housing and electrically connected to said electrical circuit for controlling the amount of power to said operator signal unit;

a time delay control knob mounted on said housing and electrically connected to said electrical circuit for adjusting a time delay before the power to said audio/visual alert unit is actuated; and brake electrical lead connected to said electrical circuit, said brake electrical lead adapted for connecting to the motorcycle's brake system and causing a pause to said electrical circuit when the brake system is activated and after the brake system is released.

13. The reminder device as described in claim 12 including a housing carrier with straps adapted for securing said circuit housing on the instrument panel of the motorcycle.

* * * * *